(12) United States Patent
Park et al.

(10) Patent No.: US 8,557,431 B2
(45) Date of Patent: Oct. 15, 2013

(54) POUCH AND SECONDARY BATTERY COMPRISING THE SAME

(75) Inventors: Seung Yeob Park, Daejeon (KR); Han Ho Lee, Daejeon (KR); Young Joon Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/822,751

(22) Filed: Jun. 24, 2010

(65) Prior Publication Data

US 2010/0310930 A1 Dec. 9, 2010

Related U.S. Application Data

(63) Continuation of application No. PCT/KR2010/01279, filed on Mar. 2, 2010.

(30) Foreign Application Priority Data

Mar. 2, 2009 (KR) .................. 10-2009-0017672
Mar. 2, 2010 (KR) .................. 10-2010-0018385

(51) Int. Cl.
*H01M 2/08* (2006.01)
*B65D 30/08* (2006.01)

(52) U.S. Cl.
USPC ..................... 429/162; 429/185; 383/109

(58) Field of Classification Search
USPC ............... 429/162, 185; 383/59, 109, 127
See application file for complete search history.

(56) References Cited

U.S. PATENT DOCUMENTS

| 6,296,971 | B1 * | 10/2001 | Hara ................... 429/185 X |
| 6,660,430 | B1 * | 12/2003 | Yoshida et al. ............ 429/185 |
| 7,125,627 | B2 * | 10/2006 | Gu ..................... 429/162 X |
| 7,297,441 | B2 * | 11/2007 | Hatta et al. .............. 429/185 |
| 7,348,099 | B2 * | 3/2008 | Mukai et al. ............. 429/185 |
| 7,393,610 | B2 * | 7/2008 | Shimamura et al. ....... 429/162 |
| 2002/0022177 | A1 | 2/2002 | Hamm |
| 2003/0118900 | A1 | 6/2003 | Otohata |

FOREIGN PATENT DOCUMENTS

| DE | 10261873 A1 | 7/2003 |
| JP | 2000-251854 A | 9/2000 |
| JP | 2005-116235 A | 4/2005 |
| KR | 10-0522682 B1 | 10/2005 |
| KR | 10-2007-0091877 A | 9/2007 |
| KR | 10-2008-0022915 A | 3/2008 |
| KR | 10-2008-0038465 A | 5/2008 |
| KR | 10-2008-0094602 A | 10/2008 |
| KR | 10-0968050 B1 | 6/2010 |
| WO | WO 01/28007 A1 | 4/2001 |
| WO | WO 01/56096 A1 | 8/2001 |

* cited by examiner

*Primary Examiner* — Stephen J. Kalafut
(74) *Attorney, Agent, or Firm* — Birch, Stewart, Kolasch & Birch, LLP

(57) ABSTRACT

Disclosed is a pouch including a first sealing portion wherein an upper sheet and a lower sheet are sealed, and a second sealing portion present in a partial or entire region of the first sealing portion.

The pouch further includes a second sealing portion present in a partial or entire region of the first sealing portion, thus efficiently preventing permeation of external moisture and leakage of electrolyte solution through the first sealing portion and enabling fabrication of batteries with improved capacitance maintenance and resistance increase.

14 Claims, 6 Drawing Sheets

US 8,557,431 B2

POUCH AND SECONDARY BATTERY COMPRISING THE SAME

This application is a Continuation of copending Application No. PCT/KR2010/001279 filed on Mar. 2, 2010, which claims priority under 35 U.S.C. §119(a) to Application Nos. 10-2009-0017672 filed in Republic of Korea on Mar. 2, 2009 and 10-2010-0018385 filed in Republic of Korea on Mar. 2, 2010. The entire contents of all of the above applications are hereby incorporated by reference.

TECHNICAL FIELD

The present invention relates to a pouch comprising a second sealing portion present in a partial or entire region of a first sealing portion wherein an upper sheet and a lower sheet are sealed, thus exhibiting improved long-term storage characteristics and thus improved battery performance, and a secondary battery comprising the same.

BACKGROUND ART

Practical applications of portable electronic appliances such as video cameras, cellular phones, portable PCs, etc., has brought about an increasing interest in secondary batteries generally used to provide operating power thereto. In particular, lithium secondary batteries are increasingly used, since they have a high energy density per unit weight and can be rapidly charged, as compared to other conventional batteries such as lead acid batteries, nickel-cadmium (Ni—Cd) batteries, nickel-hydrogen (Ni—H$_2$) batteries and nickel-zinc (Ni—Zn) batteries.

Unlike conventional non-rechargeable primary batteries, a great deal of research is conducted on secondary batteries enabling charge/discharge associated with development in high-tech industries such as digital cameras, cellular phones, notebook computers, and hybrid automobiles. Such secondary batteries may be classified into nickel-cadmium batteries, nickel-metal hydride batteries, nickel-hydrogen batteries, lithium secondary batteries, and the like. Of these, lithium secondary batteries, which are used as power sources for portable electronic appliances or are connected in series for use in high-output hybrid automobiles, have a driving voltage of 3.6V or higher. Use of lithium secondary batteries is rapidly increasing, due to 3-fold higher driving voltage and superior energy density per unit weight, as compared to nickel-cadmium batteries or nickel-metal hydride batteries.

Depending on the type of electrolyte used, lithium secondary batteries may be classified into lithium ion batteries utilizing liquid electrolytes and lithium ion polymer batteries utilizing solid polymer electrolytes. Depending on the type of solid polymer electrolyte used, lithium ion polymer batteries may be classified into perfect solid-type lithium ion polymer batteries containing no electrolyte solution and lithium ion polymer batteries using gel-type polymer electrolytes comprising an electrolyte solution.

Lithium ion batteries using liquid electrolytes are generally welding-sealed in the form of a cylindrical or prismatic metal can. Can-type secondary batteries using such a metal can as a container have a constant shape, thus disadvantageously having limited design of electronic appliances using the batteries as power sources and difficulty in reducing the volume. Accordingly, pouch-type secondary batteries wherein two electrodes and a separation membrane and an electrolyte are placed in a film-type pouch and the pouch is sealed, have been developed and put to practical use.

FIG. 1 illustrates a pouch-type secondary battery. The pouch includes a lower sheet 20 provided with an accepting portion 21 and an upper sheet 10 covering the same. An electrode assembly 30 housed in the accepting portion 21 is formed by rolling a laminate of a cathode 31, an anode 35 and a separator 33. The electrode assembly is accepted in the accepting portion 21, an upper sheet 10 and a lower sheet 20 are thermally-bonded to form the sealing portion 23, electrode taps 37 and 38 protrude from the respective electrodes, and a tape 39 may be adhered in a region where the electrode taps 37 and 38 overlap the sealing portion 23.

The pouch including the upper sheet 10 and the lower sheet 20 will be described based on the upper sheet 10. The pouch has a multi-layer structure including an inner layer 15 (a polyolefin layer) acting as a sealant due to thermal-bonding properties thereof, a metal layer 13 (aluminum layer) made of a material maintaining mechanical strength and acting as a barrier layer against moisture and oxygen, and an outer layer 11 (generally a nylon layer) which are laminated in this order. Casted polypropylene (CPP) is commonly used as a polyolefin-based resin layer.

In the process of fabricating a battery with such a pouch including the upper sheet and the lower sheet, the electrode assembly 30 including an electrode and a separator is rolled and thermally-bonded to form the sealing portion 23 in which the upper sheet is adhered to the lower sheet, as shown in FIG. 2. However, the thermal-bonding portion of the pouch is vulnerable to permeation of external moisture. Accordingly, long-term permeation of moisture is inevitable and the permeated moisture thus reacts with LiPF$_6^-$ contained in the electrolyte solution to produce HF. As a result, an anode active material is deteriorated.

Disadvantageously, the pouch-type secondary batteries may have a variety of shapes and realize secondary batteries exhibiting a predetermined capacitance with a lower volume and weight. However, unlike can-type batteries, pouch-type batteries use a soft pouch as a container and thus exhibit low mechanical strength and reliability. Accordingly, pouch-type batteries are generally applied to gel- or perfect solid-type lithium ion polymer batteries rather than lithium ion secondary batteries using an electrolyte solution having the serious problem of solution leakage.

However, pouch-type batteries should include electrodes and an electrolyte such that they can exhibit higher capacitances in response to the demand for high-capacitance secondary batteries. In addition, there is a demand to gradually decrease the size of the sealing portion which is not directly related to capacitance or capacity of batteries.

The reason for such demand is that an electrode assembly with a higher capacitance can be accepted in the pouch and the sealing portion unrelated to the capacitance can be decreased in size, as the width of the sealing portion of the pouch decreases. Accordingly, as the width of the sealing portion decreases, secondary batteries with high capacitance, as compared to a pouch of identical size, can be formed.

However, an absolute sealing area is decreased and sealing reliability of the pouch is deteriorated due to the decreased width of the sealing portion. External moisture is permeated into the pouch, which disadvantageously causes deterioration in long-term storage stability and thus battery performance. There is a need for a pouch capable of solving these problems.

DISCLOSURE

Technical Problem

Therefore, the present invention has been made in view of the above problems, and it is one object of the present invention to solve various problems of conventional secondary batteries, caused by permeation of moisture into the sealing portion and leakage of an electrolyte solution from the pouch, and thus improve performance of batteries based on enhanced long-term storage stability.

Technical Solution

In accordance with the present invention, the above and other objects can be accomplished by the provision of a pouch case of a secondary battery comprising a first sealing portion wherein an upper sheet and a lower sheet are sealed, wherein the pouch case further comprises a second sealing portion coated with an aluminum metal foil tape or an aluminum metal foil tape having at least one surface coated with an electrical insulator, thereby preventing permeation of external moisture and deterioration in battery performance.

In accordance with one aspect, provided is a pouch capable of efficiently preventing permeation of external moisture and leakage of electrolyte solution.

In accordance with another aspect, provided is a pouch-type secondary battery using the pouch, capable of efficiently preventing permeation of moisture and the electrolyte solution and thus improving long-term storage stability, thereby improving battery performance.

Advantageous Effect

The pouch according to the present invention comprises a second sealing portion formed in the first sealing portion of the upper sheet and the lower sheet constituting the pouch case, thus efficiently preventing dielectric breakdown in a final process and minimizing interference between adjacent connected cells, thereby improving battery performance.

In addition, insulating properties of the sealing portion as the pouch case can be improved and permeation of external moisture can thus be prevented and long-term storage stability can be thus improved.

DESCRIPTION OF DRAWINGS

The above and other objects, features and other advantages of the present invention will be more clearly understood from the following detailed description taken in conjunction with the accompanying drawings, in which.

BEST MODE

The pouch is characterized in that it comprises a first sealing portion in which an upper sheet and a lower sheet are sealed, and a second sealing portion present in an entire or partial portion of the first sealing portion.

In addition, the secondary battery uses a pouch having the following structure.

Hereinafter, the present invention will be described with reference to the annexed drawings in detail.

Figure 1:
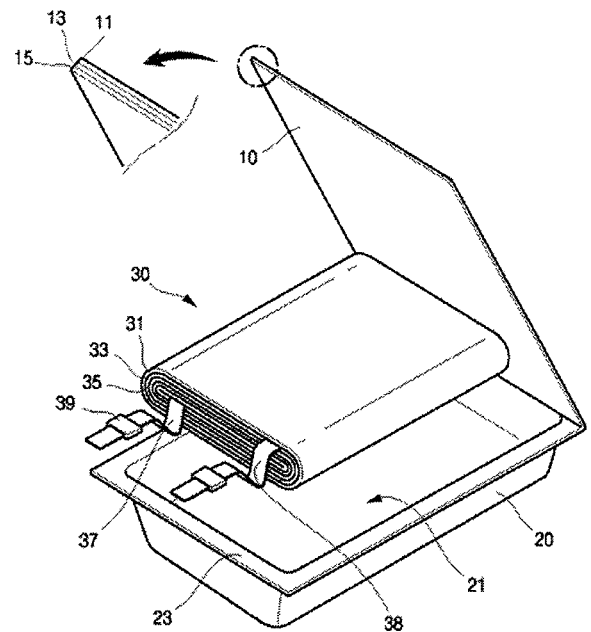
FIG. 1 illustrates a general structure of a pouch-type polymer secondary battery.
Figure 2:
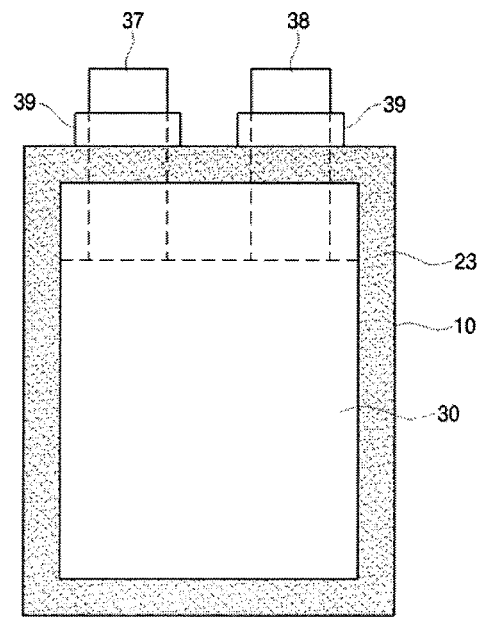
FIG. 2 illustrates a conventional pouch-type battery comprising a sealing portion.
Figure 3:
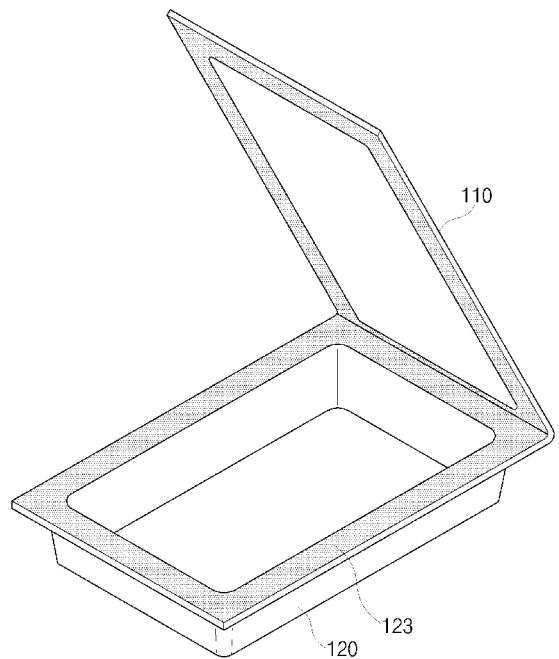
FIGS. 3 to 11 illustrate a pouch-type battery according to one embodiment.
Figure 4:
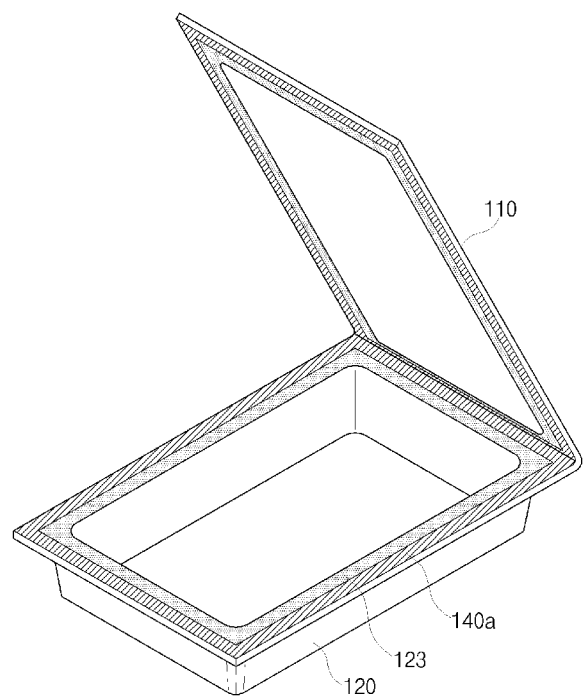
Figure 5:
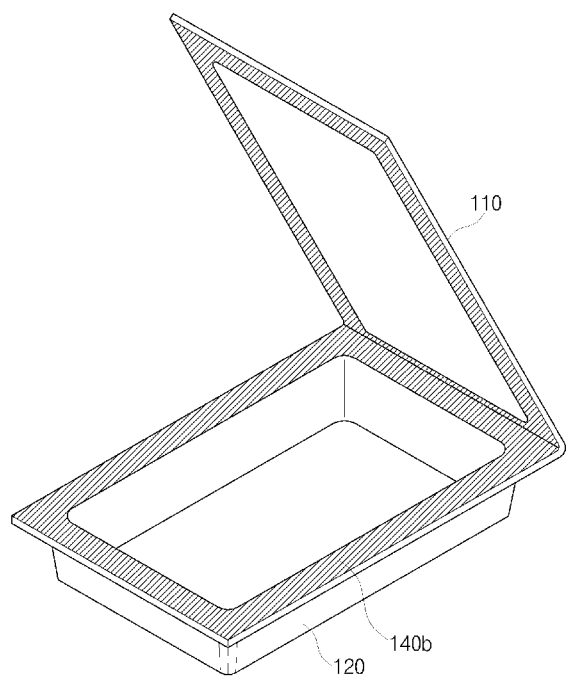

As shown in FIGS. 3 to 5, the pouch includes a first sealing portion 123 in which an upper sheet 110 and a lower sheet 120 are sealed, and a second sealing portion 140a or 140b present in an entire or partial portion of the first sealing portion 123.

FIG. 4 illustrates a second sealing portion 140a present in a portion of the first sealing portion 123 according to one embodiment, and FIG. 5 illustrates a second sealing portion 140b present in an entire portion of the first sealing portion 123.

The second sealing portion is formed with an aluminum metal foil tape or an aluminum metal foil tape having at least one surface coated with an electrical insulator. The electrical insulator may be selected from polyolefin polymers, polyester polymers and nylons. Any electrical insulator may be used without limitation so long as it has the property of being an electrical insulator.

In the case where a second sealing portion is formed in the first sealing portion in which the upper sheet and the lower sheet of the pouch case are thermally bonded using the aluminum metal foil tape or the aluminum metal foil tape having at least one surface coated with an electrical insulator, breakdown of insulation resistance locally caused by external moisture or shock due to adhesion failure between the upper sheet and the lower sheet can be prevented and interference with other connected cells can thus be minimized.

Figure 6:
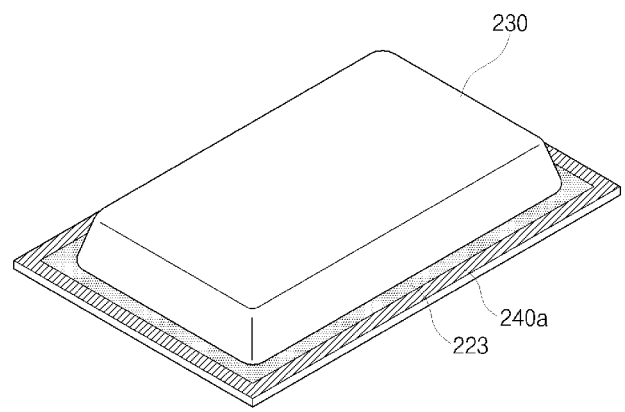
Figure 7:
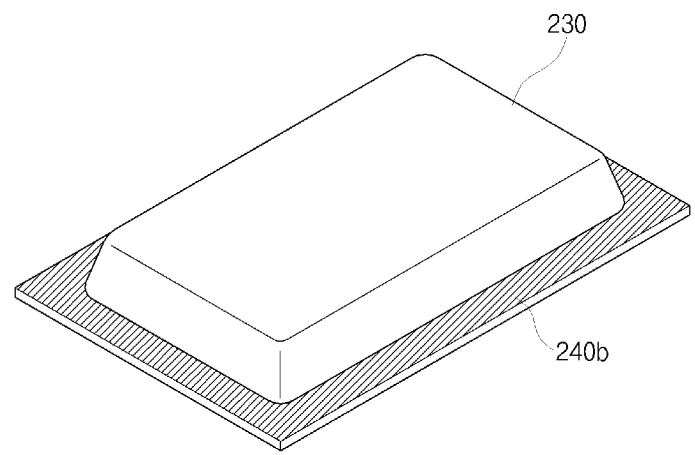

FIGS. 6 to 7 are views illustrating the pouch case in which the electrode assembly 230 of the present invention is accepted. FIG. 6 illustrates a state in which a second sealing portion 240a is formed using the aluminum metal foil tape or the aluminum metal foil tape having at least one surface coated with an electrical insulator in the first sealing portion 223 of the pouch case.

As shown in FIG. 6, according to one embodiment of the present invention, the second sealing portion 240a is arranged in a portion of the first sealing portion 223 from the outermost portion of the first sealing portion 223. Permeation of the external moisture is commonly caused by exposure of the outermost layer, the metal layer, of the first sealing portion. Accordingly, although the second sealing portion is arranged in a portion of the first sealing portion which extends from the outermost portion of the first sealing portion, in a partial portion of the first sealing portion, permeation of external moisture and leakage of electrolyte solution can be prevented.

In addition, as shown in FIG. 7, the second sealing portion 240b according to one embodiment of the present invention is present on the first sealing portion (covered with the second sealing portion and not shown in the drawing) in the same area as the first sealing portion.

In addition, according to another embodiment, the second sealing portion sealed by thermally-bonding the upper sheet and the lower sheet may be formed in an entire or partial portion of four sides of above, below, left and right and locations thereof are not particularly limited.

Figure 8:
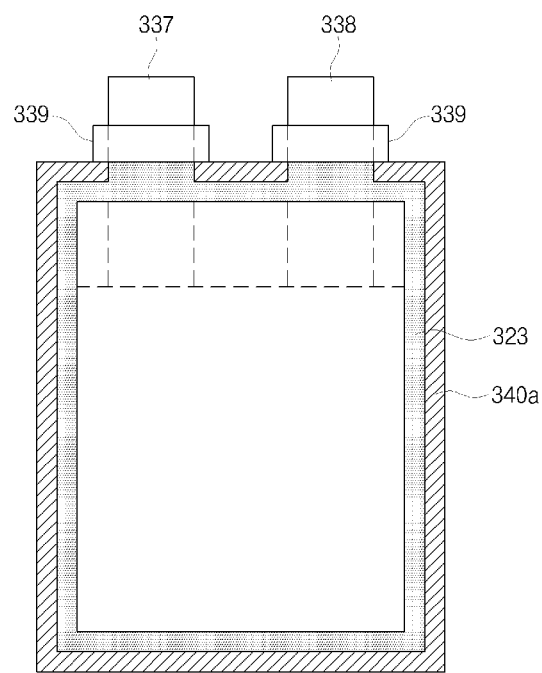

Meanwhile, as shown in FIG. 8, preferably, the second sealing portion 340a may be formed in a portion of the first sealing portion 323 where electrode taps 337 and 338 are not formed, to prevent the possibility of damaging the terminal portion.

Figure 9:
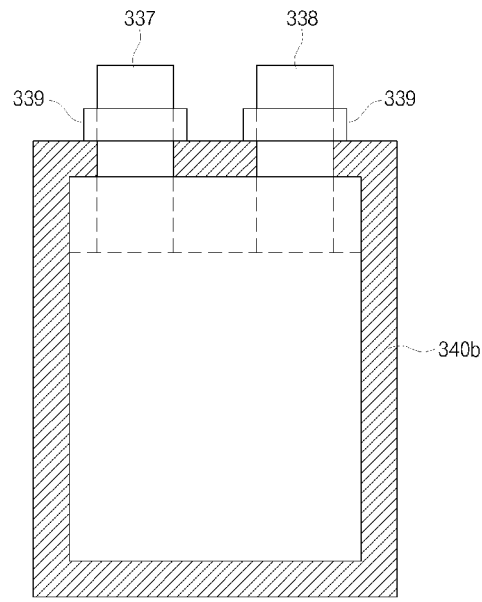

FIGS. 8 to 9 illustrate an example where respective electrode taps (cathode and anode taps, 337 and 338) are arranged in one direction.

Figure 10:
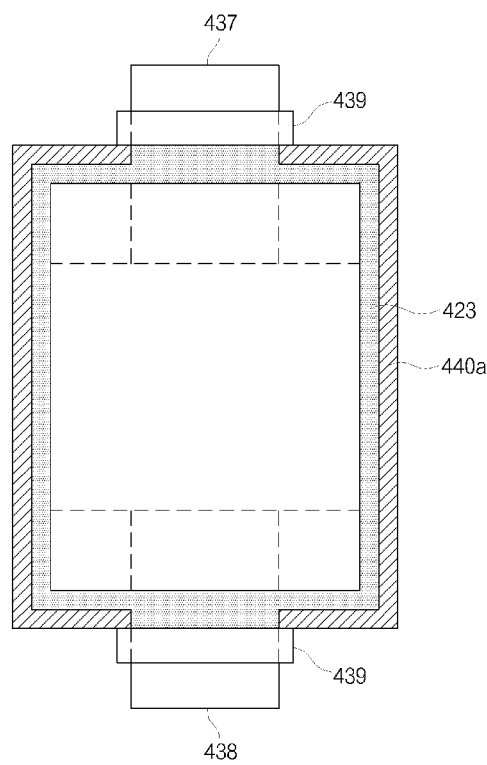
Figure 11:
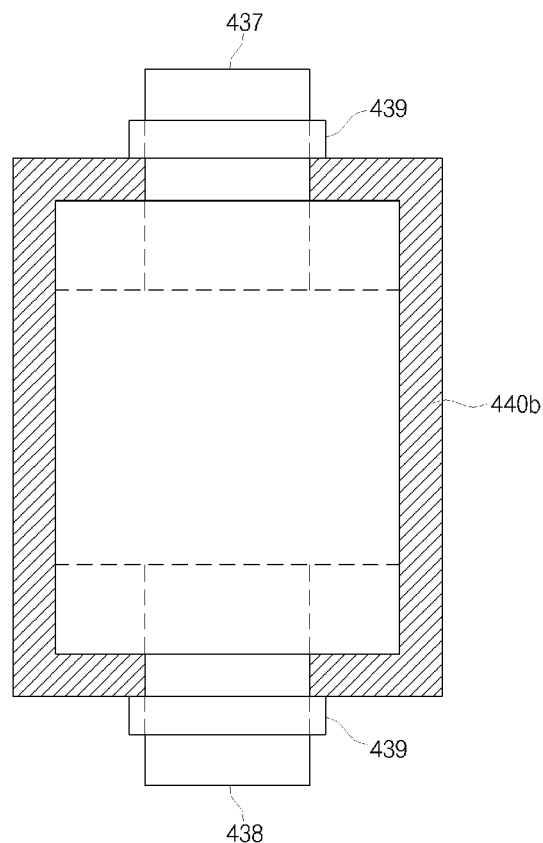

FIGS. 10 and 11 illustrate an example wherein a second sealing portion 440a or 440b is formed in a partial or entire portion in the first sealing portion 423, where electrode taps are not formed, although respective electrode taps (cathode and anode taps, 437 and 438) are arranged in opposite directions.

That is, FIGS. 8 and 9 illustrate an example wherein the second sealing portion 340a or 340b is present in a partial or entire part of the first sealing portion 323 for pouch-type batteries fabricated by accepting the electrode assembly in the pouch case and connecting the terminals of the electrode outside.

Preferably, the thickness of the second sealing portion according to the present invention is 0.1 to 400 μm. When the thickness is lower than 0.1 μm, the desired effects of the second sealing portion cannot be sufficiently exerted, and when the thickness exceeds 400 μm, practical applicability is low in view of, weight, thickness, operability and price of the batteries.

Such a second sealing portion may cause diffusion of vapor electrolyte solution under vacuum atmosphere after cell opening and final sealing due to degassing in the process of fabricating pouch-type lithium ion polymer batteries and formation of an electric current channel between the cell inside and outside by the electrolyte solution remaining on the pouch sealing portion. Accordingly, as shown in the drawing, a composite resin exhibiting superior insulating properties after final sealing is coated as a thin film, to prevent leakage of current through the cell-protecting cover made of aluminum and thus consecutive performance deterioration of adjacent cells.

Any battery may be used without limitation as to type so long as it includes a second sealing portion and has a pouch-type exterior material. Also, the electrode taps may be arranged in identical or different directions and locations thereof are not particularly limited.

The pouch of secondary batteries basically includes three layers, i.e., an inner layer (commonly, a thermal-bonding layer), a metal layer and an outer layer, and further functional layers, as necessary. The pouch of secondary batteries according to the present invention has a structure wherein a thermal-bonding layer (the side wherein the upper sheet faces the lower sheet), a metal layer and an outer layer, as a plurality of film layers composed of different materials, are laminated in this order. In addition, layers composed of different materials may be formed. For example, the CPP layer constituting the thermal-bonding layer may be replaced by one selected from polypropylene chloride, polyethylene, ethylene copolymers, copolymers of polyethylene and acrylate and copolymers of polypropylene and acrylate.

The total thickness of the pouch may be typically 40 to 120 μm, the outer layer and the inner layer are 10 to 40 μm and the metal layer is 20 to 100 μm, although the present invention is not limited thereto.

The method for manufacturing the pouch of the secondary batteries according to the present invention will be described. A pouch including an upper sheet and a lower sheet is prepared, an electrode assembly is accepted in the lower sheet and the side wherein the upper sheet faces the lower sheet is thermally-bonded and then adhered, to form a first sealing portion, as an adhesion portion. In addition, respective electrode taps extend from the electrode assembly and are formed outside of the pouch, and an insulating film 339, 439 to isolate the electrode taps from the first sealing portion is formed on the electrode taps.

The second sealing portion is formed in a partial or entire part of the first sealing portion and in a region where the electrode taps are not formed, and may have an area equivalent to or smaller than the first sealing portion.

In the case where the second sealing portion is partially arranged in the first sealing portion, the second sealing portion is arranged from the end surface of the first sealing portion. This is the reason that external moisture or inner electrolyte solution is absorbed or leaks through the end surface of the pouch case.

In addition, the present invention is directed to a secondary battery including an electrode assembly wherein two electrodes having different polarities are separated through a separator in a pouch having the afore-mentioned structure.

Examples of electrode assemblies include, but are not limited to, jelly-roll (wound-type) electrode assemblies wherein long-sheet cathodes and anodes are rolled such that the separator is interposed between the cathodes and the anodes, stack-type (laminate-type) electrode assemblies wherein a plurality of cathodes and anodes cut to a predetermined size are laminated in this order such that the separator is interposed between the cathodes and the anodes, and stack-folding type electrode assemblies formed by winding bi-cells or full-cells wherein a plurality of cathodes and anodes are laminated in this order such that the separator is interposed between the cathodes and the anodes.

The electrode assembly of the present invention comprises a cathode including a cathode active material, an anode including an anode active material, and a separator.

Specifically, the cathode, for example, is formed by applying a mixture of a cathode active material, a conductive material and a binder to a cathode collector, followed by drying, and if necessary, the mixture may further comprise a filler.

Examples of the cathode active material that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $V_2O_5$ and $Cu_2V_2O_7$; $LiFe_3O_4$; Ni-site type lithiated nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$) or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$ or composite oxides formed by any combination thereof, which are based on lithium intercalation materials as a main component.

The cathode current collector is generally fabricated to have a thickness of 3 to 500 μm. There is no particular limit to the cathode current collector, so long as it has high conductivity without causing chemical changes in the fabricated battery. As examples of the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

The conductive material is usually added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive oxides such as titanium oxide; and polyphenylene derivatives.

The binder is a component assisting in binding between the active material and conductive material, and in binding with the current collector. The binder utilized in the present invention is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene-butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode is fabricated by applying anode materials to an anode current collector, followed by drying. If necessary, other components, as described above, may be further added.

The anode current collector is generally fabricated to have a thickness of 3 to 500 μm. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated such that fine irregularities are formed on the surface thereof so as to enhance adhesion to the anode active material. In addition, the anode current collector may take various forms including films, sheets, foils, nets, porous structures, foams and non-woven fabrics.

As examples of the anode materials utilizable in the present invention, mention may be made of carbon such as non-graphitizing carbon and graphite based carbon; metal composite oxides such as $Li_xFe_2O_3$ ($0 \leq x \leq 1$), $Li_xWO_2$ ($0 \leq x \leq 1$) and $Sn_xMe_{1-x}M^1_yO_z$ (Me: Mn, Fe, Pb, Ge; Me': Al, B, P, Si, Group I, Group II and Group III elements of the Periodic Table of the Elements, halogen atoms; $0 \leq x \leq 1$; $1 \leq y \leq 3$; and $1 \leq z \leq 8$); lithium metals; lithium alloys; silicon based alloys; tin based alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

Examples of separators to separate the electrodes, the cathode and the anode include, but are not limited to, commonly known separators such as polyolefin-based separators, and composite separators wherein organic/inorganic composite layers are incorporated into an olefin base material matrix.

The electrode collector having the afore-mentioned structure is accepted in a pouch case and an electrolyte solution is injected thereinto to fabricate a battery.

The electrolyte solution is a lithium salt-containing, non-aqueous electrolyte which is composed of a non-aqueous electrolyte and lithium. As the non-aqueous electrolyte, a non-aqueous electrolyte solution, solid electrolyte and inorganic solid electrolyte may be utilized.

As the non-aqueous electrolyte solution that can be used in the present invention, for example, mention may be made of aprotic organic solvents such as N-methyl-2-pyrollidinone, propylene carbonate, ethylene carbonate, butylene carbonate, dimethyl carbonate, diethyl carbonate, γ-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymer, poly agitation lysine, polyester sulfide, polyvinyl alcohol, poly(vinylidene fluoride), and polymers containing ionic dissociation groups.

As examples of the inorganic solid electrolyte utilized in the present invention, mention may be made of nitrides, halides and sulphates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

Meanwhile, such a pouch-type secondary battery is preferably a lithium secondary battery but is not limited thereto.

EXAMPLES

Now, the present invention will be described in more detail with reference to the following examples. These examples are provided only for illustrating the present invention and should not be construed as limiting the scope and spirit of the present invention.

Example

An electrode assembly wherein a cathode and an anode are separated by a separator was accepted in a pouch case including an upper sheet and a lower sheet, the upper and lower sheets of the pouch case were thermally bonded to each other, and an aluminum metal foil tape with a thickness of 40 an was adhered to the first sealing portion of the upper and lower sheets to form a second sealing portion.

Comparative Example

A battery was fabricated in the same manner as in Example except that an aluminum metal foil tape was not adhered to the first sealing portion of the upper and lower pouch of the pouch exterior material.

Experimental Example

In order to confirm improvement in long-term storage characteristics, variations in capacitance and discharge resistance were measured at a constant temperature of 60° C. Variations in capacitance were measured from capacitances obtained through five cycles, each including charging at a 0.5 C-rate with a constant current/constant voltage (CC/CV) method (4.15V, 750 mA) and discharging at 0.5 C-rate with a constant current (CC) (3.0V) method. An increase in discharge resistance was obtained by dividing variation in electric field by current, while rapidly-discharging batteries at SOC 50 at 5 C-rate for 10 sec.

Capacitance maintenance percentage thus obtained is shown in Table 1 below. As can be seen from Table 1, as capacitance maintenance (%) increases, battery performance is improved. Resistance increase (%) is shown in Table 2 below. As can be seen from Table 2, as resistance increase % decreases, battery performance is improved.

TABLE 1

| Maintenance Period | Capacitance maintenance (%) | |
|---|---|---|
| | Comparative Example | Example |
| 0 week | 100 | 100 |
| 3 weeks | 83.9 | 85.1 |
| 6 weeks | 70.5 | 73.6 |
| 10 weeks | 51.4 | 57 |

TABLE 2

| Maintenance Period | Resistance increase (%) | |
|---|---|---|
| | Comparative Example | Example |
| 0 week | 0 | 0 |
| 3 weeks | 2.9 | 4.8 |
| 6 weeks | 26.4 | 21.0 |
| 10 weeks | 55.9 | 39.9 |

Figure 12:
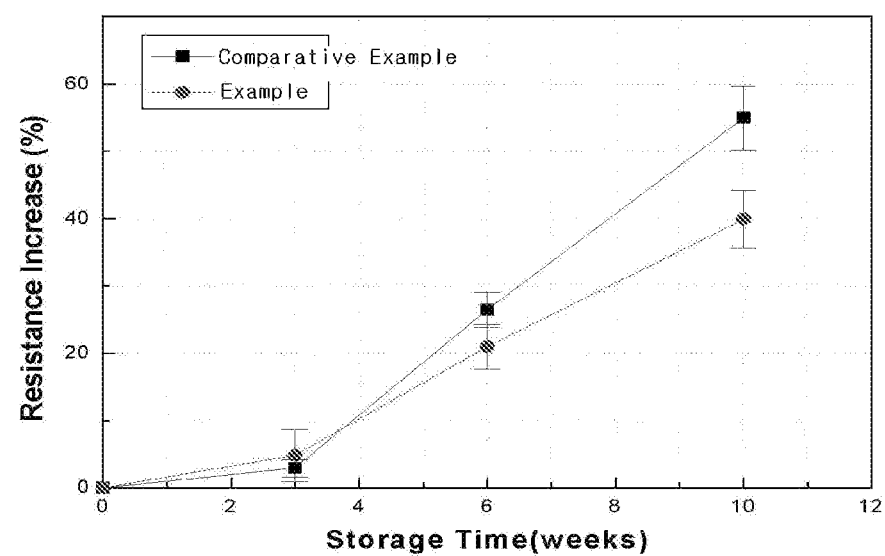
FIG. 12 is a graph showing discharge resistance as a function of storage time for batteries fabricated in Example and Comparative Example.

The results of Tables 1 and 2 indicate that the batteries of Example according to the present invention at 60° C. after a storage period of 10 weeks exhibited an about 6% higher capacitance maintenance, as compared to conventional batteries (Comparative Example) and that resistance increase exhibited an about 10% improved performance after a storage period of 10 weeks, as compared to Comparative Example. As can be seen from FIG. 12, Example of the present invention exhibited considerably improved resistance increase, as compared to Comparative Example.

Accordingly, since the second sealing portion is formed in the first sealing portion of the upper sheet and the lower sheet constituting the pouch exterior material, permeation of external moisture and leakage of electrolyte solution through the first sealing portion can be efficiently prevented and batteries with improved capacitance maintenance and resistance increase can thus be fabricated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A pouch comprising:
    a first sealing portion wherein an upper sheet and a lower sheet are sealed; and
    a second sealing portion, the second sealing portion being formed of an aluminum metal foil tape or an aluminum metal foil tape having at least one surface coated with an electrical insulator in a partial or entire region of at least one surface where the first sealing portion is formed, wherein the second sealing portion has a thickness of 0.1 to 400 μm, and wherein the second sealing portion is formed in a portion of the first sealing portion where electrode taps are not formed.

2. The pouch according to claim 1, wherein the electrical insulator is selected from polyolefin polymers, polyester polymers and nylons.

3. A pouch having an upper sheet and a lower sheet, comprising:
    a first sealing portion to be sealed; and
    a second sealing portion that is formed in a partial or entire region of at least one surface where the first sealing portion is formed, wherein the second sealing portion is present in a region of the first sealing portion where electrode taps are not formed, and wherein the second sealing portion has a thickness of 0.1 to 400 μm.

4. The pouch according to claim 3, wherein the electrode taps are arranged in identical directions.

5. The pouch according to claim 3, wherein the electrode taps are arranged in different directions.

6. A pouch having an upper sheet and a lower sheet, comprising:
    a first sealing portion to be sealed; and
    a second sealing portion that is formed in a part of at least one surface where the first sealing portion is formed, among four surfaces of the pouch where the first sealing portion is formed, wherein the second sealing portion extends from an end of the sealing portion, wherein the second sealing portion has a thickness of 0.1 to 400 μm, and wherein the second sealing portion is formed in a portion of the first sealing portion where electrode taps are not formed.

7. The pouch according to claim 1, wherein the upper sheet and the lower sheet constituting the second sealing portion include an inner layer, a metal layer and an outer layer laminated in this order.

8. A secondary battery using the pouch according to claim 1.

9. The secondary battery according to claim 8, wherein the secondary battery is a lithium secondary battery.

10. The pouch according to claim 1, wherein the second sealing portion is discontinuously formed.

11. The pouch according to claim 1, wherein the second sealing portion is formed in the surface where the first sealing portion is formed.

12. The pouch according to claim 1, wherein the second sealing portion extends from an end of the first sealing portion.

13. The pouch according to claim 12, wherein the end of the first sealing portion is an outside end.

14. The pouch according to claim 12, wherein the end of the first sealing portion is an inside end.

* * * * *